April 23, 1946.  E. G. MILLER ET AL  2,398,838
SELF-LOCKING BOLT
Filed April 1, 1944

INVENTOR
Edward G. Miller
Ralph E. Engberg
BY
Kenyon & Kenyon
ATTORNEY

Patented Apr. 23, 1946

2,398,838

UNITED STATES PATENT OFFICE 2,398,838

SELF-LOCKING BOLT

Edward G. Miller and Ralph E. Engberg, New York, N. Y., assignors, by mesne assignments, to Allied Control Company, Inc., New York, N. Y., a corporation of New York Application April 1, 1944, Serial No. 529,070

1 Claim. (Cl. 151—32)

This invention relates to self-locking bolts.

An object of this invention is a bolt having provision whereby upon being threaded into a supporting member, it is automatically locked therein against accidental removal.

One type of self-locking bolt embodying the invention consists of a shank and a head with the shank being threaded over a portion of its length but having a portion beginning at the head of less cross-section than the threaded portion. The head of the bolt facing the threaded portion is slightly recessed so that the portion of reduced cross-section extends a short distance into the bolt head. Around the portion of reduced cross-section is arranged an inset of elastic material having a circular surface of larger diameter than the minor diameter of the bolt thread but of no greater diameter than the major diameter of the thread. The configuration of the reduced cross-section portion and the aperture in the inset is such that rotation of the inset relative to the bolt is prevented.

In use, the bolt is screwed into a member having a tapped aperture of greater length than the length of the elastic inset, the threads of which aperture match the threads of the bolt. When the inset enters the tapped aperture, the aperture thread cuts a thread in the outer surface of the inset and also pushes part of the inset into the bolt head recess. The friction developed between the threads of the bolt and the member in which it is inserted by reason of the action just above mentioned, results in tightly locking the bolt in the member.

Other objects, novel features and advantages of this invention will become apparent from the following specification and accompanying drawing, wherein.

Figures 1, 2:
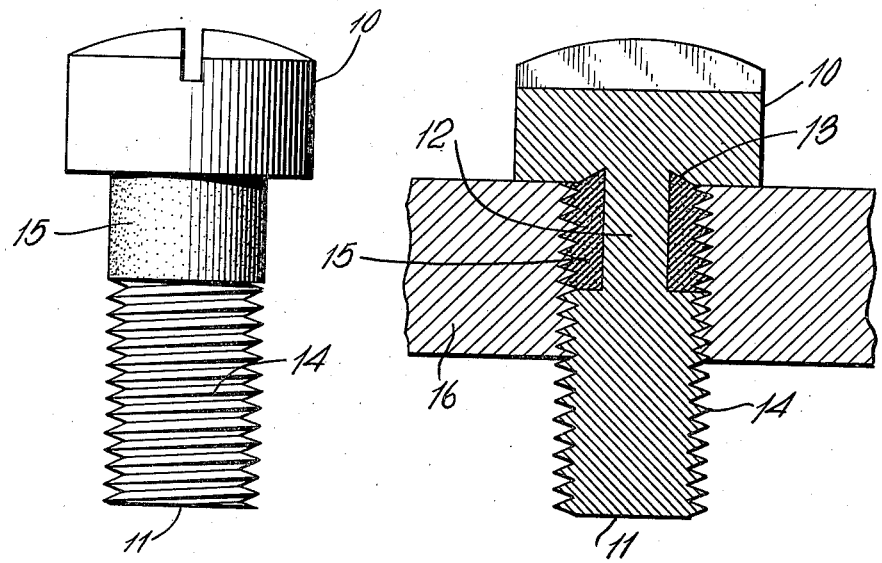
Fig. 1 is a side elevation of a bolt embodying the invention.
Fig. 2 is a longitudinal section through the bolt illustrating one form of use.

The bolt consists of a head 10 which may either be cylindrical and have a screw-driver slot in one face or may be of polygonal cross-section. A shank 11 extends from the remaining face of the head and has a portion 12 of reduced cross section adjacent said face of the head 10, the portion 12 preferably being of polygonal configuration. The remainder of the shank 11 beyond the portion 12 is provided with standard screw threads 14. A recess 13 is provided in the face of the head 10 from which the shank 11 extends and is of less diameter than the major diameter of the shank thread.

An inset 15 of elastic material surrounds the portion 12 and has a polygonal aperture conforming to the configuration of said portion. The inset 15 may be a split ring which may be expanded sufficiently to put it in place around the portion 12 or it may be a member molded on the portion 12. The exterior surface of the inset 15 is circular and is of larger diameter than the minor diameter of the threads 14 but of no greater diameter than the major diameter of said threads. The overall diameter of the inset 15 slightly exceeds the maximum diameter of the recess 13 so that normally no portion of the inset 15 extends into the recess 13.

Fig. 2 illustrates one manner of use of the bolt. In this figure, 16 is a metallic member of greater thickness than the length of the inset 15 and has a tapped aperture 17, the threads of which match the threads 14. Introduction of the inset 15 into the tapped aperture by threading the bolt thereinto causes the threads 17 to cut corresponding threads in the surface of the inset and also to project part of the inset 15 into the recess 13, relative rotation of the inset and bolt being prevented by reason of the matching polygonal configuration of the portion 12 and the aperture through the inset. The friction developed between the threads 14 and 17 and the friction developed between the end of the inset 15 and the surface of the recess 13 results in tightly locking the bolt in the member 16.

Figure 3:
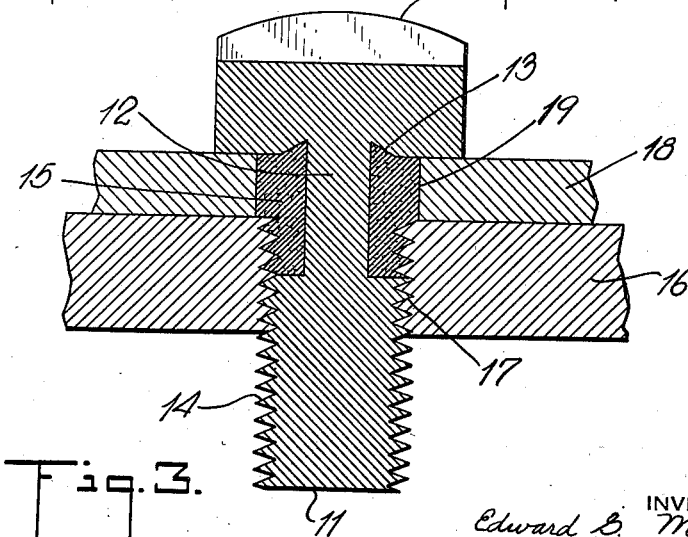
Fig. 3 is a view similar to Fig. 2 showing another use.

In Fig. 3, 16 is a metallic member having a tapped aperture and 18 is a metallic member having a smooth surface aperture 19. The bolt shank extends first through the aperture 19 and is threaded into the tapped aperture 17. The inset 15 is of greater extent than the thickness of the plate 18 so that threading of the bolt shank 14 into the tapped aperture 17 cuts threads in a portion of the inset 15. As explained in connection with Fig. 2, a portion of the inset is caused to project into the recess 13 to assist in the locking action.

We claim:

A self-locking bolt comprising a head having a shank extending from one face thereof, said shank having a portion of reduced polygonal cross-section adjacent said head and having its remaining portion provided with a screw thread, an elastic inset having a polygonal aperture fitting said portion, said inset being cylindrical and of greater diameter than the minor diameter of said screw thread, and a socket in the face of said head adjacent said inset.

EDWARD G. MILLER.
RALPH E. ENGBERG.